(No Model.)
A. ROELOFS.
Bracket Support.
No. 238,159. Patented Feb. 22, 1881.
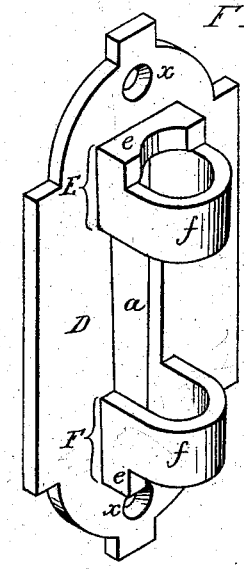
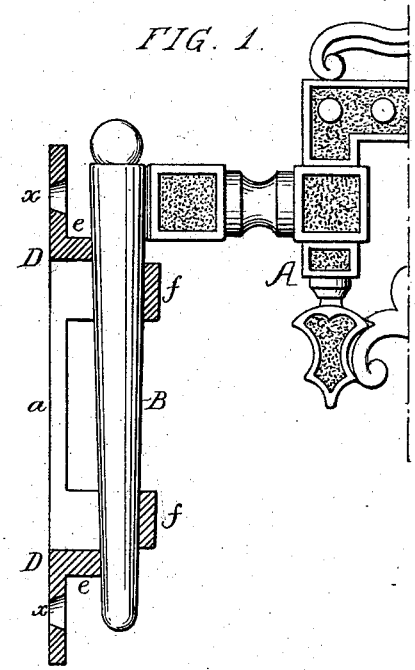
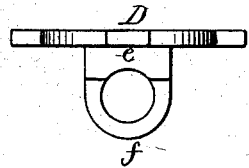
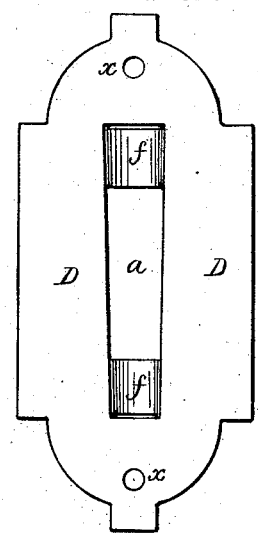
WITNESSES
James F. Tobin.
Henry Howson Jr.
INVENTOR
Anthony Roelofs
by his Attorneys
Howson and Son

UNITED STATES PATENT OFFICE.

ANTHONY ROELOFS, OF PHILADELPHIA, PENNSYLVANIA.

BRACKET-SUPPORT.

SPECIFICATION forming part of Letters Patent No. 238,159, dated February 22, 1881.

Application filed August 30, 1880. (No model.)

*To all whom it may concern:*

Be it known that I, ANTHONY ROELOFS, a citizen of the United States, residing in Philadelphia, Pennsylvania, have invented certain Improvements in Bracket-Supports, of which the following is a specification.

My invention relates to swinging brackets for supporting lamps and other articles; and my invention consists in the combination of a bracket, having a tapering pivot-pin, with a wall-plate constructed in the peculiar manner fully described hereinafter, and having bearings so adapted to the said tapering pin that there shall be a continuous friction of the same in the said bearings, the bracket thereby remaining in any position to which it may be adjusted.

In the accompanying drawings, Figure 1 is a vertical section of the wall-plate and an elevation of part of the bracket; Fig. 2, a perspective view of the wall-plate; Fig. 3, a top view of the said wall-plate, and Fig. 4 a rear view of the same.

A is part of the bracket having a tapering pivot-pin, B, and D is the wall-plate, which, as regards external shape, may be varied to suit the taste of the manufacturer, and which is provided with appropriate screw-holes $x$. There is on the plate a vertically-elongated opening, $a$, Fig. 4, and in front of the plate are two bearings, E and F, for the tapering pivot-pin of the bracket. Each bearing is in two halves, the half $e$ projecting from the solid part of the plate, and the half $f$, which is separate from the half $e$, being formed by a hollow projection which crosses the slotted portion of the plate. By constructing the bearings in this manner the entire plate can be economically molded, and is cast without the aid of cores in a manner well understood by those familiar with the art of molding.

When the pin of the bracket has been introduced into its bearings there will be a constant tendency of the pin, owing to the weight of the bracket and the object which it supports, to so wedge itself as to create a friction, to overcome which a slight effort in turning the bracket will be required; but the friction is sufficient to retain the bracket in any position to which it has to be moved.

No finished work is required in carrying out my invention, the plate and its bearings being simply a casting, subjected to no treatment other than that of ordinary cleansing, and it is the same with the bracket and its tapering pivot-pin.

Owing to the tapering form of the pin B and bearings E F slight variations in the diameter of the same, due to the rapping of the patterns in removing them from the sand or to other causes, will not prevent the pin from properly entering and seating itself in the bearings, thus overcoming an objection to that class of bracket-supports in which a cylindrical pin on the bracket is adapted to a reamed or milled bearing on the wall-plate, slight variations in the diameter of the pin or bearing in such cases either preventing the entrance of the pin into the bearing or causing a loose fit.

A bracket with a tapering pin adapted to a tapering bearing has been heretofore used, but the pin had a collar resting on the top of the bearing, and hence a continuous friction was not obtained.

I claim as my invention—

The combination of the wall-plate D, having bearings E and F, constructed, as described, with the lamp-bracket having a tapering pin adapted to the said bearings, the pin being continued upward in its tapering form above the highest bearing to insure a permanent friction, all substantially as set forth.

In testimony whereof I have signed my name to this specification in the presence of two subscribing witnesses.

ANTHONY ROELOFS.

Witnesses:
JAMES F. TOBIN,
HARRY SMITH.